No. 657,375.  
W. H. WILLIAMS.  
LEAD WIRE FOR BLASTING.  
(Application filed July 5, 1900.)
(No Model.)
Patented Sept. 4, 1900.
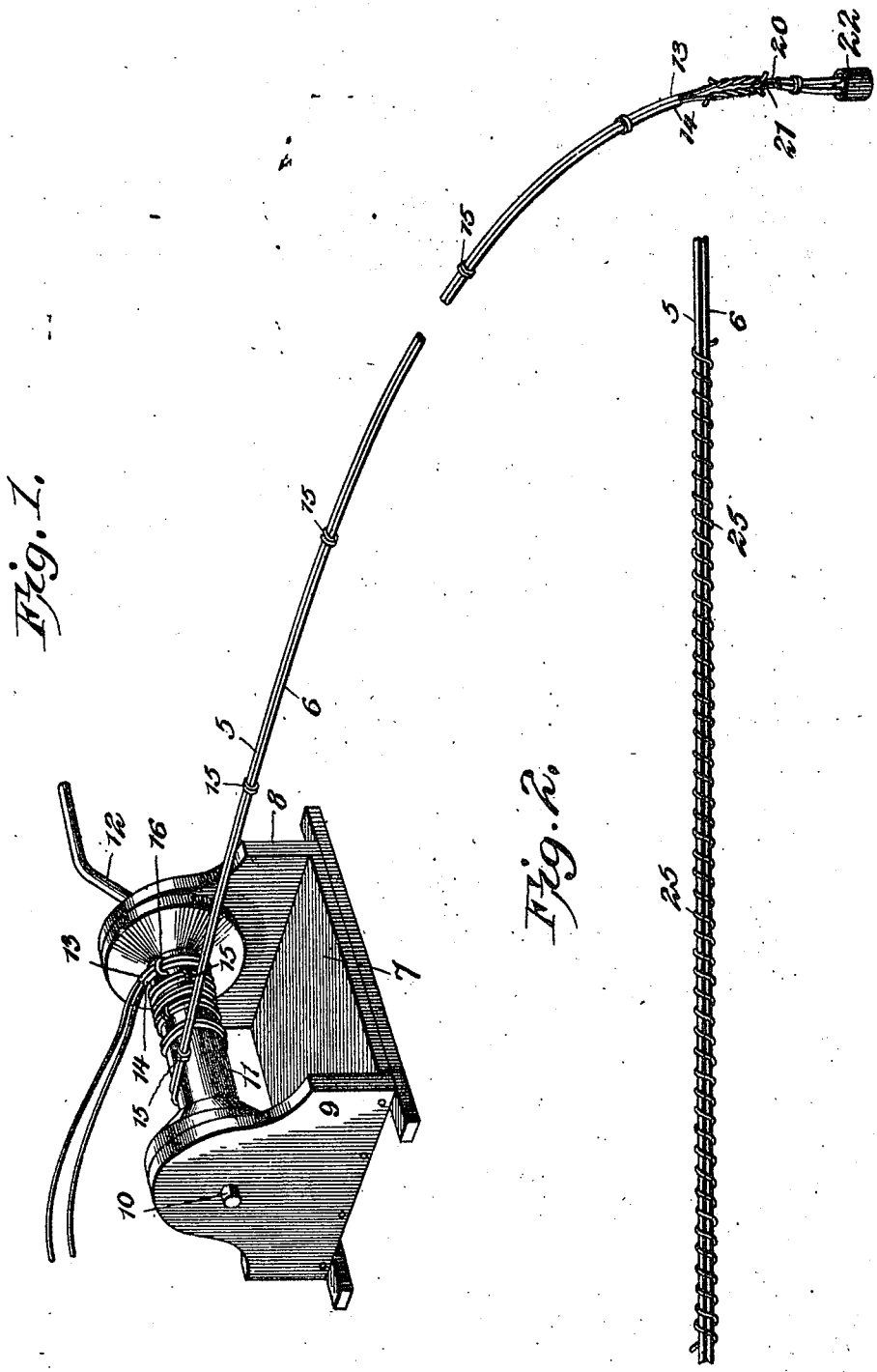

UNITED STATES PATENT OFFICE.

WILLIAM HENRY WILLIAMS, OF CONCORD, NEW HAMPSHIRE.

LEAD-WIRE FOR BLASTING.

SPECIFICATION forming part of Letters Patent No. 657,375, dated September 4, 1900.

Application filed July 5, 1900. Serial No. 22,603. (No model.)

*To all whom it may concern:*

Be it known that I, WILLIAM HENRY WILLIAMS, a citizen of the United States, residing at West Concord, in the county of Merrimac and State of New Hampshire, have invented a new and useful Lead-Wire for Blasting, of which the following is a specification.

This invention relates to lead-wires in general, and more particularly to that class used in conducting electric currents in setting off a blast, wherein the conductor-wires which form a complete metallic circuit are connected to lie side by side and are wound upon a reel.

The object of the invention is to so arrange the wires that they may be readily wound and unwound from the reel and may be connected with the energizing source, whether a battery or magneto, at any stage of their unwinding and wherein the wires will not become tangled, so that they will be wound and unwound evenly, a further object of the invention being to provide a protecting-coating which will save the insulation of the wires from abrasive action of the rocks and rough ground over which they must be drawn.

In the drawings forming a portion of this specification, and in which like numerals of reference indicate similar parts in the several views, Figure 1 is a perspective view showing a winding-drum having a pair of conducting-wires partly wound thereon and connected thereto to represent the present invention. Fig. 2 is an elevation showing a pair of conducting-wires provided with a protective wrapping in accordance with the present invention.

Referring now to the drawings, the reel upon which the pair of conductor-wires 5 and 6 are wound consists of a base 7, having uprights 8 and 9 at its ends, which uprights 8 and 9 have bearings therein in which is journaled the shaft 10 of the winding-drum 11, this drum being fixed to the shaft to rotate therewith and the shaft having a crank 12 at one end for rotating it.

The conductor-wires 5 and 6 consist, preferably, of copper and are provided with insulating-coverings, (indicated at 13 and 14, respectively,) the insulating material terminating short of the ends of the wires for the attachment of the cap-wires and the wires from the battery or magneto. As shown in the drawings, the wires 5 and 6 are connected at intervals by wrappings 15 to hold the wires firmly together to prevent slipping of one with respect to the other, and in order to insure the winding of the wires upon the drum when the latter is rotated the wires are stapled down upon the surface of the drum by means of a staple 16, which is engaged with insulated portions of the wires adjacent to their bared ends. The staple is engaged adjacent to one end of the drum, so that the wires may be wound upon the drum without overlapping the stapled portions of the wires, and thus without covering up the bared projecting ends thereof. The intermittent wrappings 15 are sufficiently close together to cause the wires to lie side by side upon the drum and also to insure the unwinding of both wires evenly when the ends of the wires are drawn outwardly to unwind the wires from the drum preparatory to firing a blast. After the wires are drawn out to the proper extent the wires 20 and 21 of a cap 22 are connected with the outer ends of the wires 5 and 6, as illustrated in Fig. 1, while the opposite ends of the wires 5 and 6, which project rearwardly from the winding-drum, are connected with a battery, magneto, or other source of electricity of sufficient potential. The cap is inserted in the blast in the usual manner and is discharged.

In Fig. 2 of the drawings is shown a modification, in which the two conductor-wires 5 and 6 are provided with a common wrapping 25 of flexible wire, which wrapping not only acts to hold the conductor-wires together to cause them to wind upon and unwind from the drum evenly, but also protects the insulation of the wires when in use.

It will of course be understood that in practice the wrappings of the wires may be spaced as desired and that other modifications of the specific arrangement shown may be made without departing from the spirit of the invention.

What is claimed is—

1. The combination with a winding-drum of a plurality of conductors attached thereto and adapted to be wound thereon, said conductors being connected at intervals.

2. The combination with a winding-drum of a plurality of insulated conductors wound thereon and connected thereto at a point adjacent to one end, said conductors being connected at intervals and having their extremities free from insulation.

3. The combination with a winding-drum of a plurality of insulated conductors connected thereto adjacent to one end, the shorter end of the conductors at one side of their connection being free from insulation and adapted for attachment of a source of electricity, and the wires at the opposite side of the point of attachment to the drum being adapted to be wound upon the drum and having their extremities adapted for attachment to a cap.

4. The combination with a winding-drum of a plurality of insulated wires attached thereto and adapted to be wound thereon at one side of their point of attachment, said wires having a helical wrapping of wire over the insulation to protect the latter, the convolutions of the wrapping being separated to connect the wires at intervals.

5. A lead for blasting comprising two insulated wires connected at intervals to prevent tangling when wound upon or unwound from a drum.

6. A lead for blasting comprising two wires independently insulated and connected at intervals, said wires having their end portions free of insulation to permit connection with a blast and with a source of electricity.

In testimony that I claim the foregoing as my own, I have hereto affixed my signature in the presence of two witnesses.

WILLIAM HENRY WILLIAMS.

Witnesses:
GEO. R. CONNELL,
FRED N. LADD.